United States Patent
Kyung

(10) Patent No.: US 8,054,350 B2
(45) Date of Patent: Nov. 8, 2011

(54) SHADE CORRECTION FOR LENS IN IMAGE SENSOR

(75) Inventor: Kyu-Min Kyung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 949 days.

(21) Appl. No.: 12/012,357

(22) Filed: Feb. 1, 2008

(65) Prior Publication Data

US 2008/0204574 A1   Aug. 28, 2008

(30) Foreign Application Priority Data

Feb. 23, 2007   (KR) .................. 10-2007-0018579

(51) Int. Cl.
*H04N 9/64*   (2006.01)
(52) U.S. Cl. ................ 348/251; 348/615; 382/247
(58) Field of Classification Search ............. 348/251, 348/615; 382/247
See application file for complete search history.

(56) References Cited

U.S. PATENT DOCUMENTS

| | | | | |
|---|---|---|---|---|
| 5,157,497 A | * | 10/1992 | Topper et al. | 348/615 |
| 6,831,687 B1 | * | 12/2004 | Suzuki | 348/251 |
| 7,391,450 B2 | * | 6/2008 | Pinto et al. | 348/251 |
| 7,652,698 B2 | * | 1/2010 | Morishita | 348/251 |

OTHER PUBLICATIONS

Korean Patent Application No. 1020040065165 to Kim et al., having Publication date of Feb. 22, 2006 (w/ English Abstract page).
Korean Patent Application No. 1020040071794 to Jin, having Publication date of Mar. 13, 2006 (w/ English Abstract page).
Japanese Patent Application No. 09-340271 to Toshiaki, having Publication date of Jul. 2, 1999 (w/ English Abstract page).
Japanese Patent Application No. 2004-163295 to Masaya, having Publication date of Dec. 15, 2005 (w/ English Abstract page).
Japanese Patent Publication No. 08-331571 to Jun, having Publication date of Dec. 13, 1996 (w/ English Abstract page).
Japanese Patent Publication No. 2004-235958 to Koji, having Publication date of Aug. 19, 2004 (w/ English Abstract page).
Japanese Patent Publication No. 2006-121612 to Tomonori et al., having Publication date of May 11, 2006 (w/ English Abstract page).
Japanese Patent Publication No. 2007-028042 to Kenichi et al., having Publication date of Feb. 1, 2007 (w/ English Abstract page).

* cited by examiner

*Primary Examiner* — Anthony J Daniels
(74) *Attorney, Agent, or Firm* — Monica H. Choi

(57) ABSTRACT

An apparatus for performing shade correction for a lens in an image sensor includes a gain profile extractor, a common profile calculator, a gain controller calculator, and a memory device. The gain profile extractor generates a respective channel gain profile for each of a plurality of color channels from image data. The common profile calculator generates a common profile from the channel gain profiles. The gain controller calculator generates a respective gain controller for each of the plurality of color channels from the common profile and the channel gain profiles. A memory device stores the common profile and the gain controllers.

18 Claims, 12 Drawing Sheets

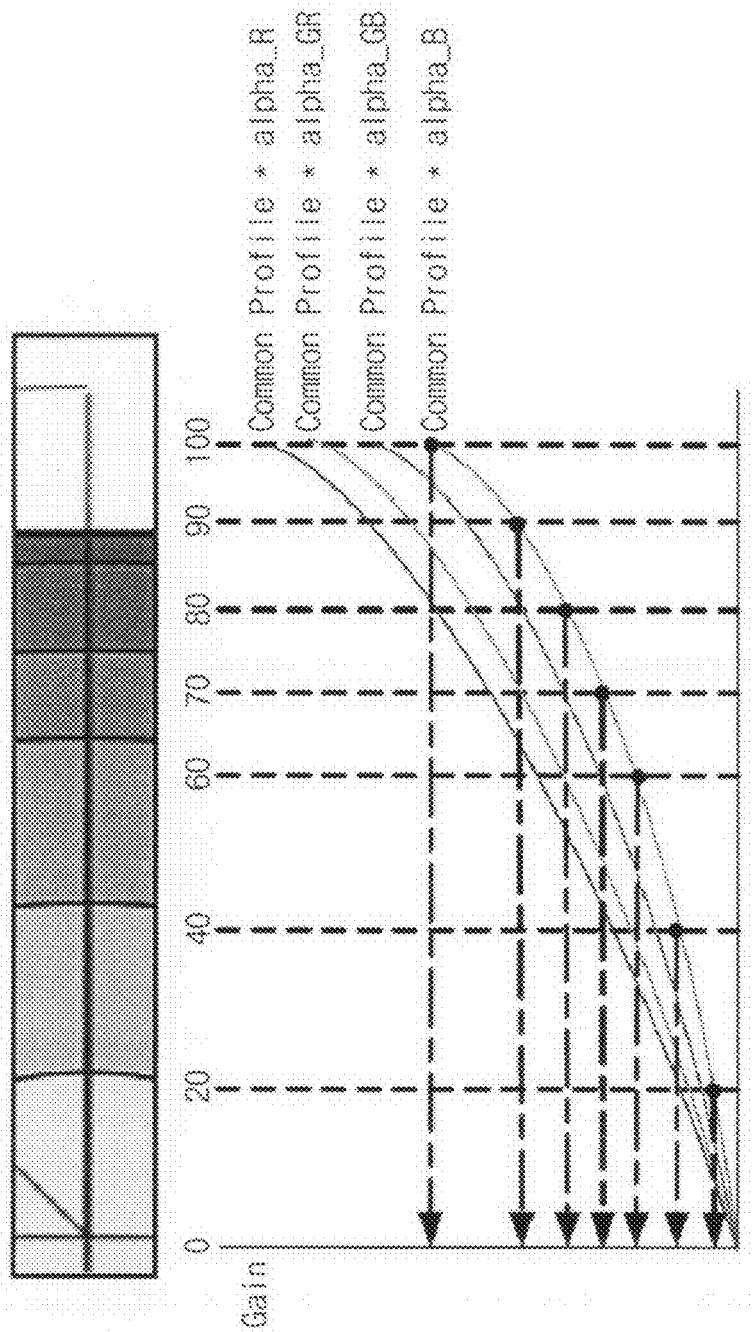

SHADE CORRECTION FOR LENS IN IMAGE SENSOR

This application claims priority under 35 USC §119 to Korean Patent Application No. 2007-18579 filed on Feb. 23, 2007 in the Korean Intellectual Property Office, the disclosure of which is incorporated herein in its entirety by reference.

BACKGROUND OF THE INVENTION

1. Field of the Invention

The present invention relates generally to a lens system of an image sensor, and more particularly, to brightness correction for a lens in such a lens system.

2. Background of the Invention

A lens generally has curved surfaces such that the curvature of the lens causes light to be concentrated toward a focus center. Thus, light passing through the lens is not spread uniformly. Accordingly, correction for nonuniformity of brightness of an image passed through the lens is necessary. Such a correction is referred to as lens correction or shade correction.

FIG. 1A illustrates the non-uniformity of the brightness of an image transmitted through a lens. FIG. 1B graphically plots the brightness profiles for the R (red), G (green), and B (blue) color components along a horizontal section running through the focus center for the image of FIG. 1A.

FIGS. 1A and 1B illustrate that that light is concentrated toward the focus center for the image transmitted through the lens. For example, the peak of the brightness profile in FIG. 1B is the focus center of the lens with the brightness being the lowest toward the edges of the image.

FIG. 2A shows an image regenerated from the image of FIG. 1A using general lens correction. FIG. 2B graphically plots the brightness profiles for the RGB color components along a horizontal section running through the focus center for the image of FIG. 2A. FIGS. 2A and 2B illustrate that light intensity is more uniformly distributed over the image.

Lens correction techniques are generally classified into radial lens correction or grid lens correction. Profile information for color channels are used for lens correction. For example, channel gain profiles denoting 2-dimensional brightness distributions of R, GR, GB, and B color channels are used for lens correction. R denotes a Red color channel, and B denotes a Blue color channel. GR denotes a Green color channel adjacent to a Red color channel in a row, and GB denotes a Green color channel adjacent to a Blue color channel in a row.

FIG. 3A shows the image of FIG. 1A with a grid formed thereon. FIG. 3B exemplarily illustrates a grid lens correction technique for the image of FIG. 3A, according to the prior art. For example in FIG. 3B, a point E is surrounded by grid summit points A, B, C, and D where respective color correction gains are known.

Thus, the brightness at the point E is corrected using the color correction gains at the grid summits A, B, C, and D. For example, a color correction gain E at the point E is represented by Equation 1 below:

$$E = A^*(1-x)^*(1-y) + B^*x^*(1-y) + C^*y^*(1-x) + D^*x^*y \qquad \text{[Equation 1]}$$

In the equation above, A, B, C, and D are color correction gains respectively at the points A, B, C, and D. x and y above represent the distance ratios as shown in FIG. 3B.

Such a grid lens correction technique is accurate, but requires storage of all data for the grid summits. Such storage of the data of all the grid summits may require costly memory capacity.

SUMMARY OF THE INVENTION

Accordingly, a radial lens correction technique of the present invention uses small memory capacity with less data storage.

An apparatus for performing shade correction for a lens in an image sensor according to an aspect of the present invention includes a gain profile extractor, a common profile calculator, a gain controller calculator, and a memory device. The gain profile extractor generates a respective channel gain profile for each of a plurality of color channels from image data. The common profile calculator generates a common profile from the channel gain profiles. The gain controller calculator generates a respective gain controller for each of the plurality of color channels from the common profile and the channel gain profiles. The memory device stores the common profile and the gain controllers.

In a further embodiment of the present invention, the apparatus further includes an approximator for generating approximated image data from the image data. In that case, the gain profile extractor generates the channel gain profiles from the approximated image data.

The apparatus in another embodiment of the present invention includes a lens shade correction module for generating corrected image data by multiplying subsequent image data by the common profile and the gain controllers.

In a further embodiment of the present invention, each of a plurality of color channels for the subsequent image data is multiplied by the common profile and the respective gain controller for each color channel of the subsequent image data.

In another embodiment of the present invention, the channel gain profiles and the common profile are each a respective function of a distance from a focus center of the lens.

In a further embodiment of the present invention, each of the gain controllers is a respective constant value that is a respective ratio of the respective gain controller and the common profile. Alternatively, each of the gain controllers is a respective function of the distance from the focus center of the lens derived as a respective ratio of the respective gain controller and the common profile.

In another embodiment of the present invention, the common profile is one of an average of the channel gain profiles or a weighted average of the channel gain profiles.

In an example embodiment of the present invention, the image data is generated from a pixel array having a Bayer color pattern. In that case, the color channels include a R (red) channel, a GR (green-red) channel, a GB (green-blue) channel, and a B (blue) channel.

In a further embodiment of the present invention, the apparatus for performing shade correction includes a data processor and a memory device having sequences of instructions stored thereon. Execution of such sequences of instructions by the data processor causes the data processor to perform the steps of the gain profile extractor, the common profile calculator, the gain controller calculator, the approximator, and the lens shade correction module that are implemented as software modules executed by the data processor.

The present invention may be used to particular advantage when the common profile and the gain controllers corresponding to the lens are determined once during manufacture of the image sensor. Because just the common profile and the gain controllers are stored, relatively little memory capacity is used for shade correction of the lens according to the present invention.

BRIEF DESCRIPTION OF THE DRAWINGS

The above and other features and advantages of the present invention will become more apparent when described in detailed exemplary embodiments thereof with reference to the attached drawings in which:

FIG. 4B magnifies profile graphs in FIG. 4A;

The figures referred to herein are drawn for clarity of illustration and are not necessarily drawn to scale. Elements having the same reference number in FIGS. 1A, 1B, 2A, 2B, 3A, 3B, 4A, 4B, 5A, 5B, 6A, 6B, 7A, 7B, 8, 9, and 10 refer to elements having similar structure and/or function.

DETAILED DESCRIPTION OF THE INVENTION

Preferred embodiments of the present invention are now described below in more detail with reference to the accompanying drawings. The present invention may, however, be embodied in different forms and should not be construed as limited to the embodiments set forth herein. Rather, these embodiments are described so that this disclosure will be thorough and complete, and will fully convey the scope of the present invention to those skilled in the art.

Figure 8:
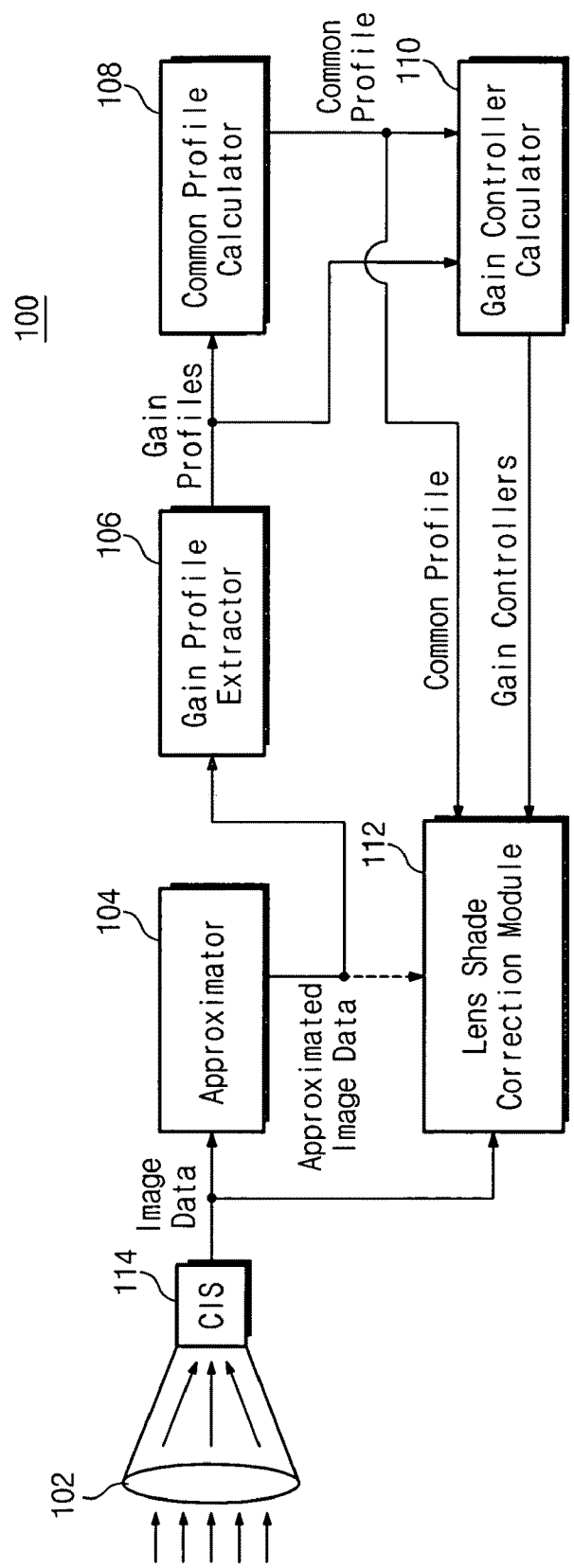
FIG. 8 shows a block diagram of an apparatus for performing the radial lens correction technique according to an embodiment of the present invention.

FIG. 8 shows a block diagram of an apparatus in an image sensor 100 for performing shade correction for a lens 102 according to an embodiment of the present invention. Referring to FIG. 8, such an apparatus of the image sensor 100 includes an approximator 104, a gain profile extractor 106, a common profile calculator 108, a gain controller calculator 110, a lens shade correction module 112, and a CIS (CMOS image sensor) 114.

Figure 10:
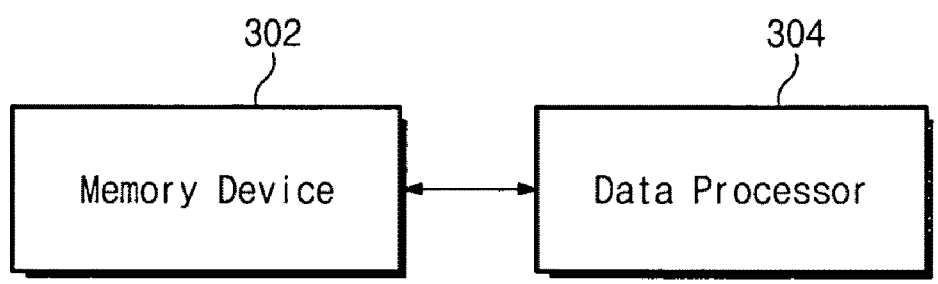
FIG. 10 shows a memory device and a data processor for implementing components of FIG. 8, according to an embodiment of the present invention.

Referring to FIGS. 8 and 10, the approximator 104, the gain profile extractor 106, the common profile calculator 108, the gain controller calculator 110, and the lens shade correction module 112 are each implemented as a software module stored in a memory device 302 and executed by a data processor 304. In that case, the image sensor 100 includes the memory device 302 and the data processor 304.

The memory device 302 has sequences of instructions (i.e. software) stored thereon. Execution of such sequences of instructions by the data processor 304 causes the data processor 304 to perform the functionalities of the approximator 104, the gain profile extractor 106, the common profile calculator 108, the gain controller calculator 110, and the lens shade correction module 112, including the steps of the flowcharts of FIGS. 5A and 5B.

Alternatively, the present invention may also be practiced with the approximator 104, the gain profile extractor 106, the common profile calculator 108, the gain controller calculator 110, and the lens shade correction module 112, each being implemented as respective hard-ware components.

Figure 9:
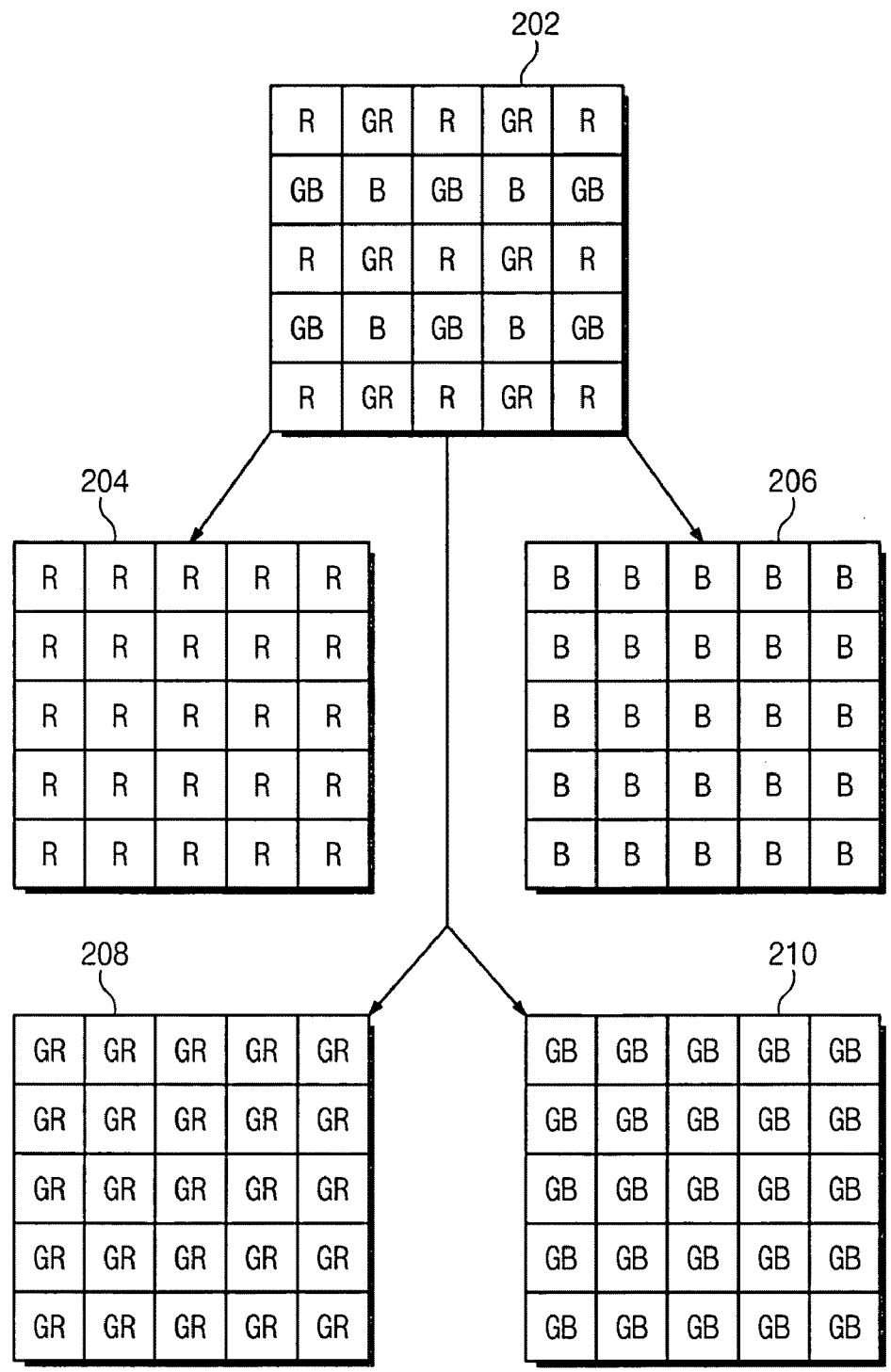
FIG. 9 illustrates a Bayer color pattern including R (red), B (blue), GR (green-red), and GB (green-blue) color channels, according to an embodiment of the present invention.

Referring to FIGS. 8 and 9, the CIS 114 includes a pixel array 202 having a Bayer color pattern. In the Bayer color pattern of the pixel array 202, "R" indicates a pixel for sensing red color light reaching the pixel, and "B" indicates a pixel for sensing blue color light reaching the pixel. In addition, "GB" indicates a pixel for sensing green light reaching the pixel in a row having green pixels alternating with blue pixels. Furthermore, "GR" indicates a pixel for sensing green light reaching the pixel in a row having green pixels alternating with red pixels.

The image data with the Bayer color pattern of the pixel array 202 is interpolated to generate a R (red) color component channel 204, a B (blue) color component channel 206, a GR (green-red) color component channel 208, and a GB (green-blue) color component channel 210 as illustrated in FIG. 9. The R color component channel 204 indicates a respective intensity of red light reaching each of the pixel locations of the pixel array 202. The B color component channel 206 indicates a respective intensity of blue light reaching each of the pixel locations of the pixel array 202.

In addition, the GR color component channel 208 indicates a respective intensity of green light reaching each of the pixel locations of the pixel array 202 if such pixel were to be disposed adjacent red pixels in that row. Similarly, the GB color component channel 210 indicates a respective intensity of green light reaching each of the pixel locations of the pixel array 202 if such pixel were to be disposed adjacent blue pixels in that row.

Interpolation techniques for generating the R, B, GR, and GB color component channels 204, 206, 208, and 210 from the Bayer color pattern image data 202, individually and generally, are known to one of ordinary skill in the art.

Figure 5A:
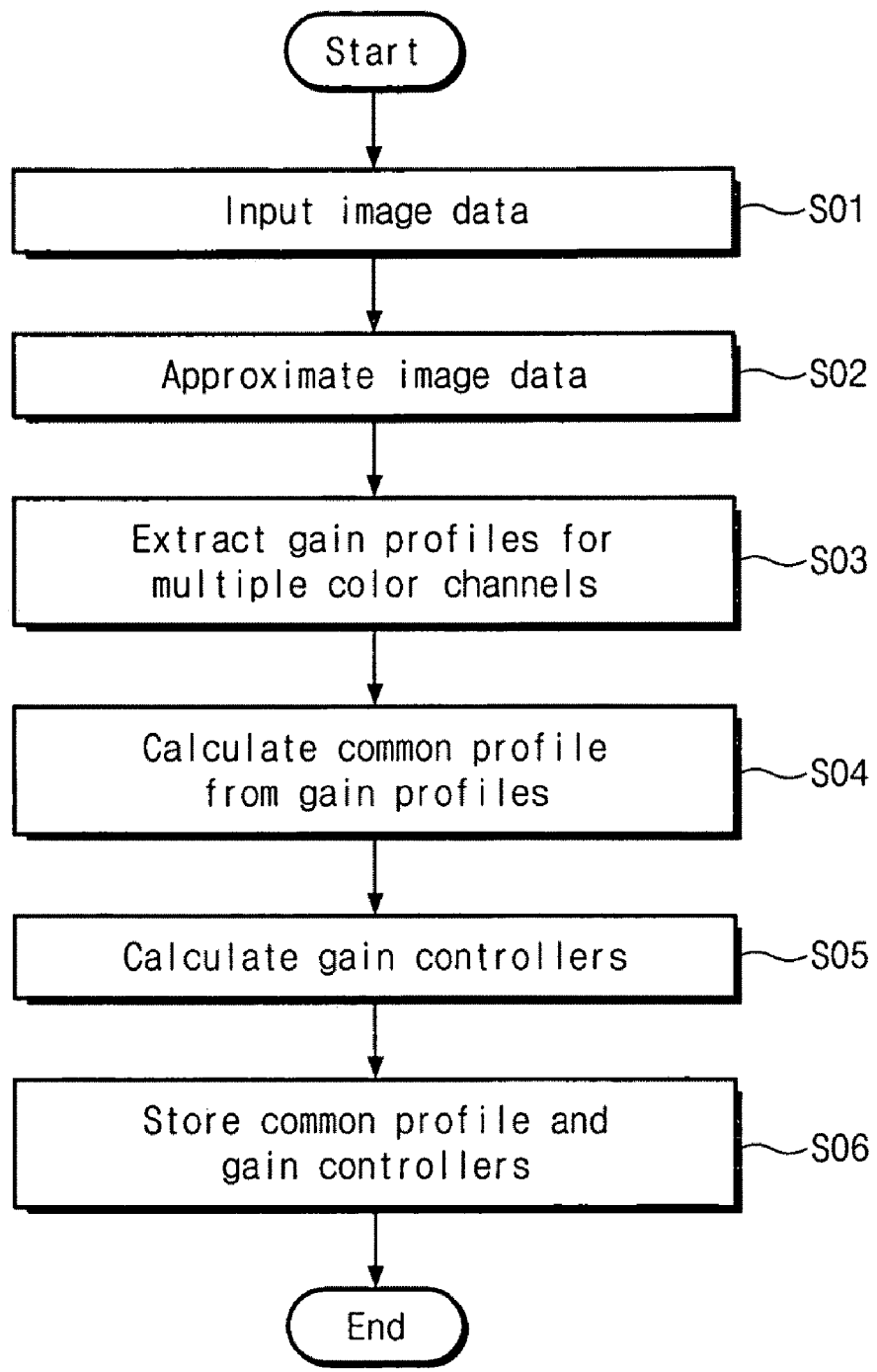
FIGS. 5A and 5B show flow charts of steps performed in the radial lens correction technique, according to an embodiment of the present invention.

The image sensor 100 first operates according to the flow-chart of FIG. 5A to characterize the lens 102 for shade correction of the lens 102. In one embodiment of the present invention, such characterization according to the flow-chart of FIG. 5A is performed once during manufacture of the image sensor 100.

Referring to FIGS. 5A and 8, the pixel array 202 of the CIS 114 generates image data from sensing the image transmitted through the lens 102 (step S01 of FIG. 5A). Such image data from the pixel array 202 may initially be stored in the memory device 302. Also, such image data from the pixel array 202 has high frequency noise components. Thus, the approximator 104 removes such high frequency noise components from the image data to generate smoother approximated image data (step S02 of FIG. 5A).

For example, the approximated image data is generated by the approximator 104 by being modeled as a respective polynomial equation that may be expressed as the following Equation 2:

$$\text{Approximated Image Data} = AX^N + BX^{N-1} + CX^{N-2} + \ldots YX + Z \quad \text{[Equation 2]}$$

Figure 4A:
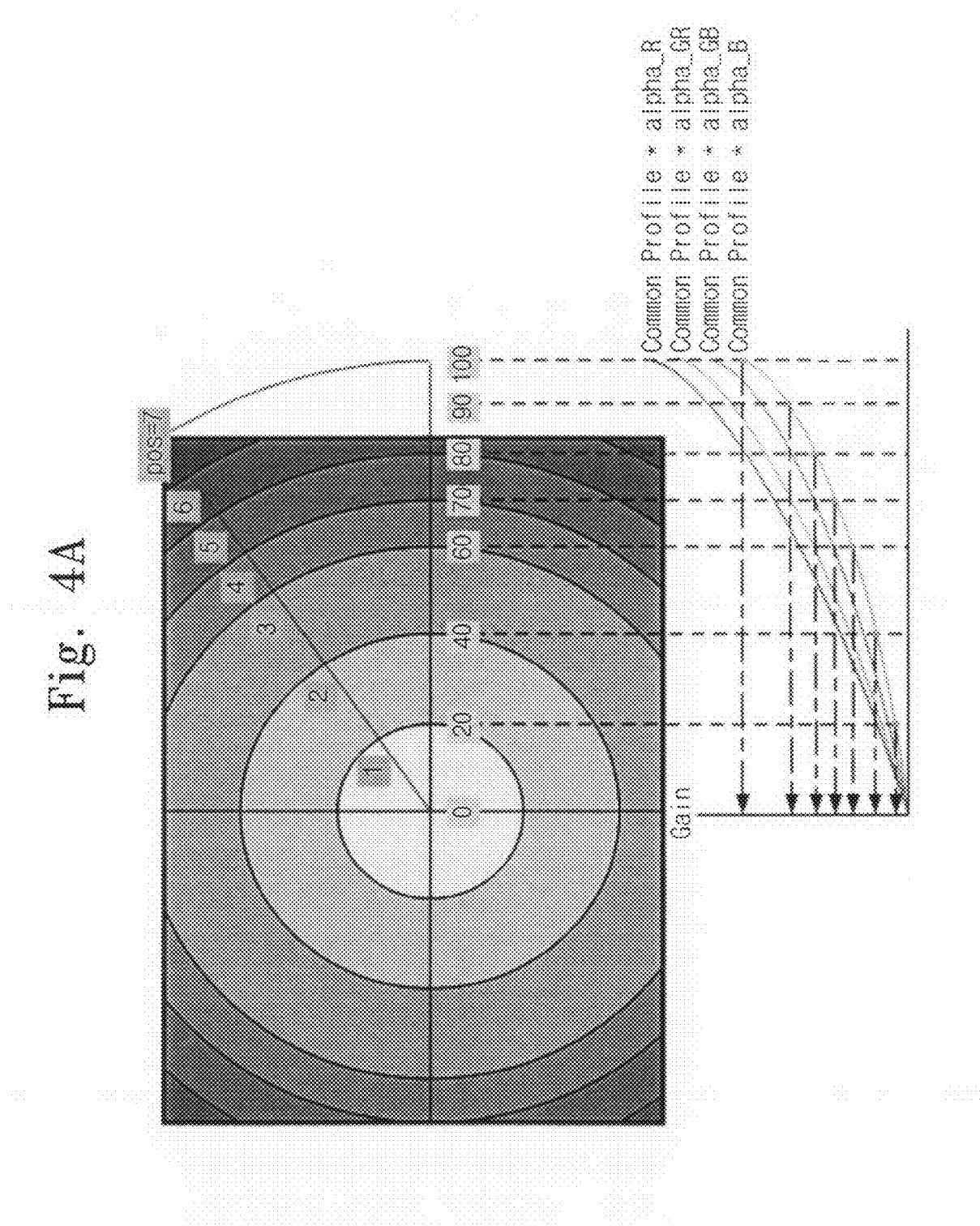
FIG. 4A illustrates a radial lens correction technique according to an embodiment of the present invention.

Subsequently, the approximated image data is used by the gain profile extractor 106 to generate a respective channel gain profile for each of the R, B, GR, and GB color component channels (step S03 of FIG. 5A). FIGS. 4A and 4B show examples of the respective channel gain profiles with each being a respective plot of gain versus a distance from a focus center (labeled "0" in FIGS. 4A and 4B) of the lens 102. The focus center is a center point for the highest intensity of light as focused by the curvature of the lens 102.

For example, the respective channel gain profile for the R color channel 204 is the curve labeled as Common Profile*alpha_R in FIGS. 4A and 4B. The respective channel gain profile for the B color channel 206 is the curve labeled as Common Profile*alpha_B in FIGS. 4A and 4B. The respective channel gain profile for the GR color channel 208 is the curve labeled as Common Profile*alpha_GR in FIGS. 4A and 4B. The respective channel gain profile for the GB color channel 210 is the curve labeled as Common Profile*alpha_GB in FIGS. 4A and 4B.

Referring to FIGS. 4A and 4B, assuming that a distance from the focus center to a summit of a tetragonal image data region is 100, the channel gain profiles for the R, GR, GB, and B color channels are generated for the distances of 20, 40, 60, 70, 80, 90, and 100 from the focus center.

For example, during characterization of the lens 102 for shade correction, white light is passed through the lens 102. Subsequently, each channel gain profile is calculated by the gain profile extractor 106 such that multiplying each color channel with the respective channel gain profile along the radial distance from the focus center would result in substantially uniform intensity of light across the whole image that has passed through the lens 102.

Further referring to FIGS. 5A and 8, the common profile calculator 108 determines a common profile from the respective channel gain profiles for the R, B, GR, and GB color channels (step S04 of FIG. 5A). For example, the common profile is determined as an average of the channel gain profiles for the R, B, GR, and GB color channels.

Alternatively, the common profile is determined as a weighted average of the channel gain profiles for the R, B, GR, and GB color channels. In that case, a respective weighting coefficient is used for each of the channel gain profiles for the R, B, GR, and GB color channels depending on the sensitivity of the pixel array 202 to each of the R, B, GR, and GB color components.

Further referring to FIGS. 5A and 8, the gain controller calculator 110 determines a respective gain controller for each of the R, B, GR, and GB color channels from the common profile and the respective channel gain profiles for the R, B, GR, and GB color channels (step S05 of FIG. 5A). The gain controllers include alpha_R, alpha_GR, alpha_GB, and alpha_B in FIGS. 4A and 4B.

Alpha_R is a ratio of the R-channel gain profile to the common profile. Alpha_GR is a ratio of the GR-channel gain profile to the common profile. Alpha_GB is a ratio of the GB-channel gain profile to the common profile. Alpha_B is a ratio of the B-channel gain profile to the common profile.

Equations 3 below are used by the gain controller calculator 110 for determining the gain controllers alpha_R, alpha_GR, alpha_GB, and alpha_B:

$$\text{alpha\_R} = (R\text{-channel gain profile})/(\text{common profile})$$

$$\text{alpha\_GR} = (GR\text{-channel gain profile})/(\text{common profile})$$

$$\text{alpha\_GB} = (GB\text{-channel gain profile})/(\text{common profile})$$

$$\text{alpha\_B} = (B\text{-channel gain profile})/(\text{common profile}) \quad \text{[Equations 3]}$$

In one embodiment of the present invention, the gain controllers alpha_R, alpha_GR, alpha_GB, and alpha_B are each a respective constant value. Alternatively, the gain controllers alpha_R, alpha_GR, alpha_GB, and alpha_B are each a respective function along the distance from the focus center of the lens 102.

In any case, the gain controllers alpha_R, alpha_GR, alpha_GB, and alpha_B are determined by the gain controller calculator 110 so as to minimize the difference between the channel gain profiles generated by the gain profile extractor 106 and the result of multiplying alpha_R, alpha_GR, alpha_GB, and alpha_B with the common profile. For example, alpha_R is determined by the gain controller calculator 110 for minimizing the difference between the R-channel gain profile generated by the gain profile extractor 106 and the result of multiplying alpha_R and the common profile. Similarly, alpha_B is determined by the gain controller calculator 110 for minimizing the difference between the B-channel gain profile generated by the gain profile extractor 106 and the result of multiplying alpha_B and the common profile.

Also, alpha_GR is determined by the gain controller calculator 110 for minimizing the difference between the GR-channel gain profile generated by the gain profile extractor 106 and the result of multiplying alpha_GR and the common profile. Additionally, alpha_GB is determined by the gain controller calculator 110 for minimizing the difference between the GB-channel gain profile generated by the gain profile extractor 106 and the result of multiplying alpha_GB and the common profile.

The common profile that is a single function along the distance from the focus center and the four channel gain controllers alpha_R, alpha_GR, alpha_GB, and alpha_B are stored such as in the memory device 302 or in a data register (step S06 of FIG. 5A). The determination and the storage of the common profile and the four channel gain controllers alpha_R, alpha_GR, alpha_GB, and alpha_B ends the characterization for shade correction of the lens 102 in FIG. 5A.

In one embodiment of the present invention, steps S01, S02, S03, S04, S05, and S06 are performed once during manufacture of the image sensor 100 for characterizing the shade correction of the lens 102. After manufacture, the image sensor 100 operates according to the flow-chart of FIG. 5B.

Figure 5B:
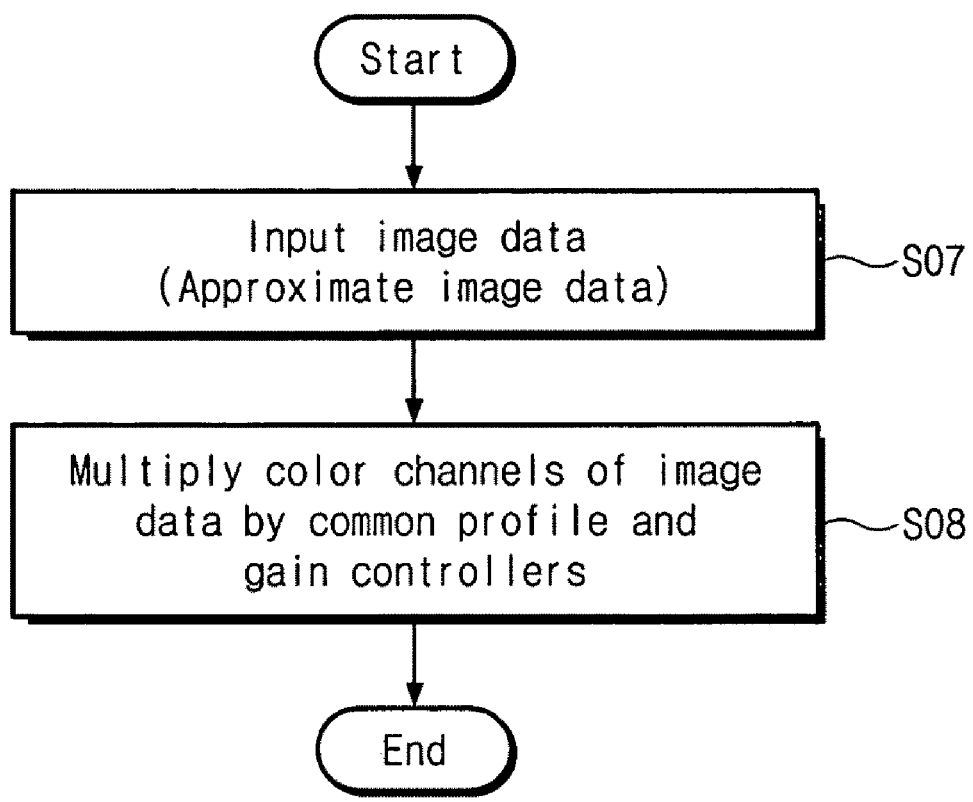

Referring to FIGS. 5B and 8, the pixel array 202 of the CIS 114 generates subsequent image data for an image passed through the lens 102. The lens shade correction module 112 inputs such image data 202 to generate the R, B, GR, and GB color channels 204, 206, 208, and 210 (step S07 of FIG. 5B). In an alternative embodiment of the present invention, the lens shade correction module 112 uses the approximated image data from the approximator 104.

In any case, the lens shade correction module 112 performs shade correction on the image data 202 using the common profile and the gain controllers alpha_R, alpha_GR, alpha_GB, and alpha_B (step S08 in FIG. 5B). For example, the R color channel data 204 is multiplied by the common profile and the alpha_R to generate corrected R color channel data having more uniform light intensity. The R color channel data 204 along the distance from the focus center of the lens 102 is multiplied by alpha_R and the corresponding value of the common profile at the corresponding distance from the focus center of the lens 102.

Similarly, the B color channel data 206 along the distance from the focus center of the lens 102 is multiplied by alpha_B and the corresponding value of the common profile at the corresponding distance from the focus center of the lens 102. Also, the GR color channel data 208 along the distance from the focus center of the lens 102 is multiplied by alpha_GR and the corresponding value of the common profile at the corresponding distance from the focus center of the lens 102. Additionally, the GB color channel data 210 along the distance from the focus center of the lens 102 is multiplied by alpha_GB and the corresponding value of the common profile at the corresponding distance from the focus center of the lens 102.

The Equations 4 below express such lens shade correction according to the present invention:

Corrected $R$-channel image data=Original $R$-channel image data*Common Profile*alpha_$R$ Corrected $B$-channel image data=Original $B$-channel image data*Common Profile*alpha_$B$ Corrected $GR$-channel image data=Original $GR$-channel image data*Common Profile*alpha_$GR$ Corrected $GB$-channel image data=Original $GB$-channel image data*Common Profile*alpha_$GB$     [Equations 4]

Figure 3A:
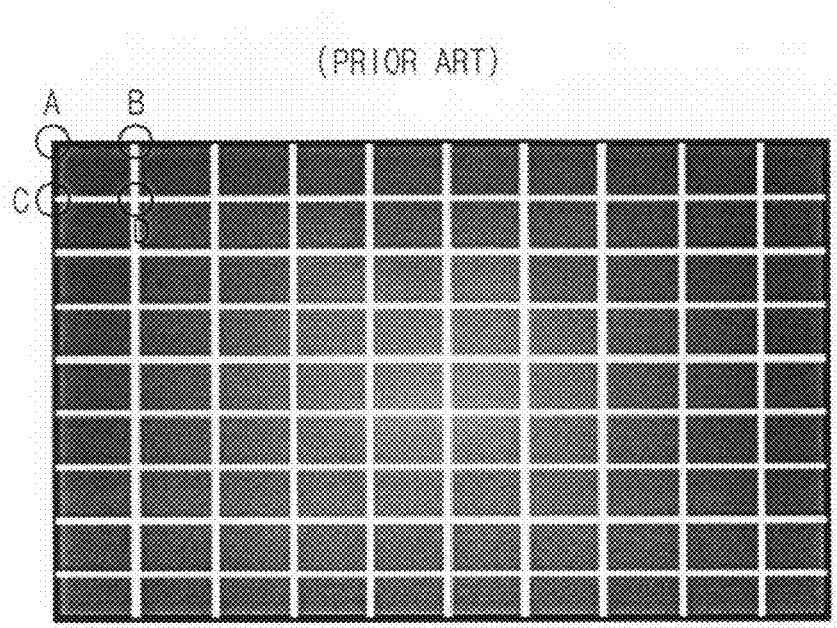
FIG. 3A shows the image of FIG. 1A with a grid formed thereon, according to the prior art.
Figure 3B:
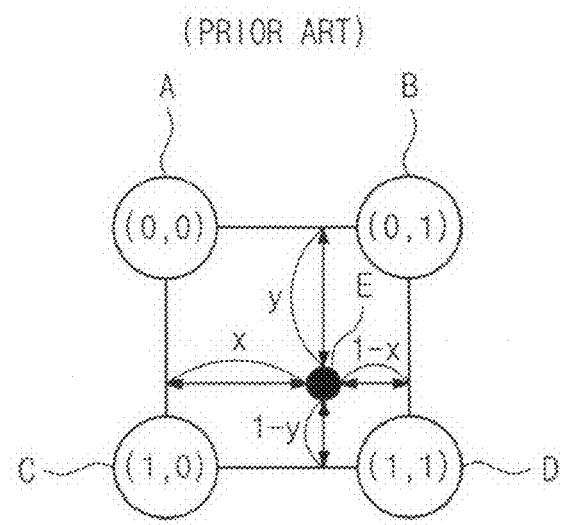
FIG. 3B exemplarily illustrates a grid lens correction technique for the image of FIG. 3A, according to the prior art.

Table 1 below lists a respective gate count and a respective number of registers used for the prior grid lens correction technique of FIGS. 3A and 3B and for the radial lens correction technique of the present invention.

TABLE 1

|  | Gate count | Performance | Register number |
|---|---|---|---|
| Grid lens correction | 100,000 | High | 2323 |
| Present lens correction | 30,000 | Some high | 68 |

In Table 1, "gate count" indicates a circuit size and "register number" indicates the amount of data used for lens correction. The radial lens correction technique of the present invention has less gate count and less number of registers than the grid lens correction technique of the prior art.

The grid lens correction technique of the prior art requires high gate count and number of registers for storing brightness information for all grid points. In contrast, the radial lens correction method of the present invention stores significantly less data of just the single common profile and the four gain controllers alpha_R, alpha_GR, alpha_GB, and alpha_B such that a significantly smaller number of gate count and registers are used. Thus, the lens correction technique of the present invention is especially amenable for mobile applications.

Figure 1A:
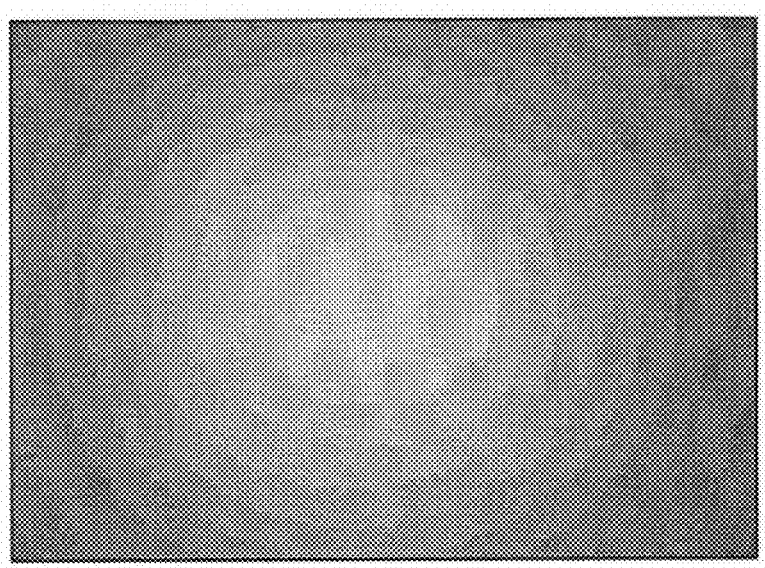
FIG. 1A illustrates an image transmitted through a lens with non-uniformity of brightness.
Figure 1B:
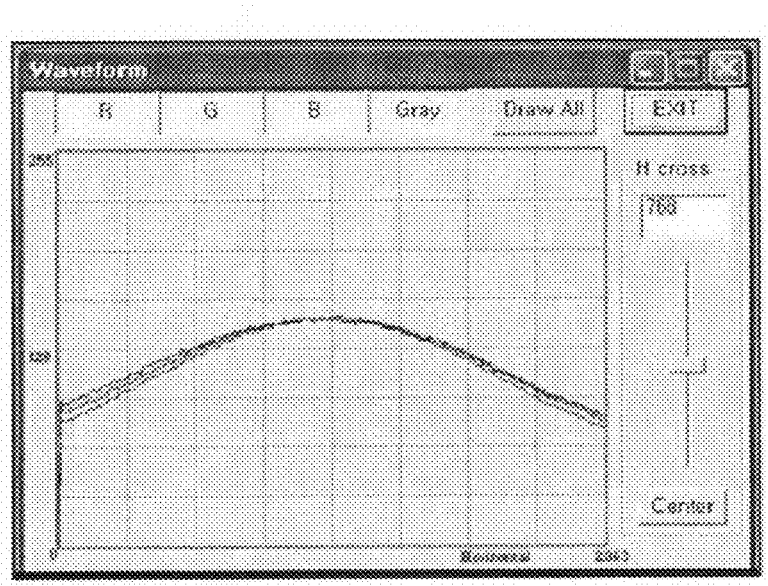
FIG. 1B graphically plots a distribution profile of brightness along a horizontal section of the image of FIG. 1A.
Figure 2A:
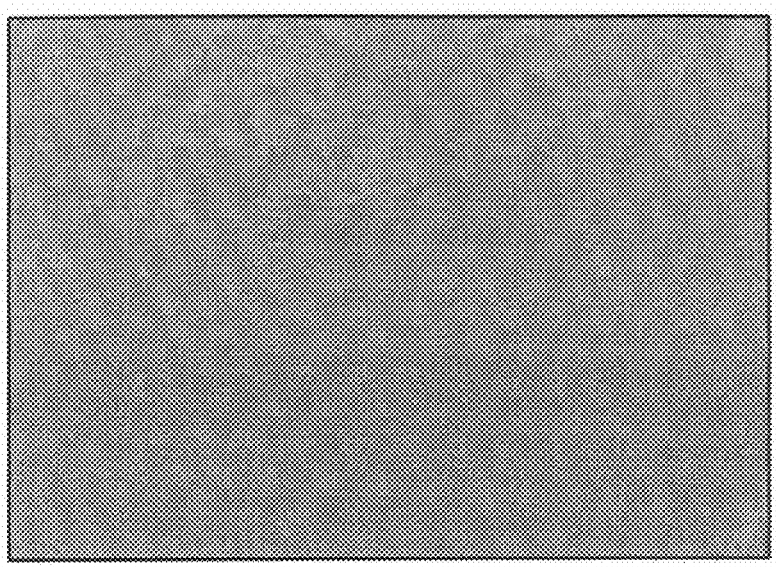
FIG. 2A illustrates an image regenerated from the image of FIG. 1A by general lens correction.
Figure 2B:
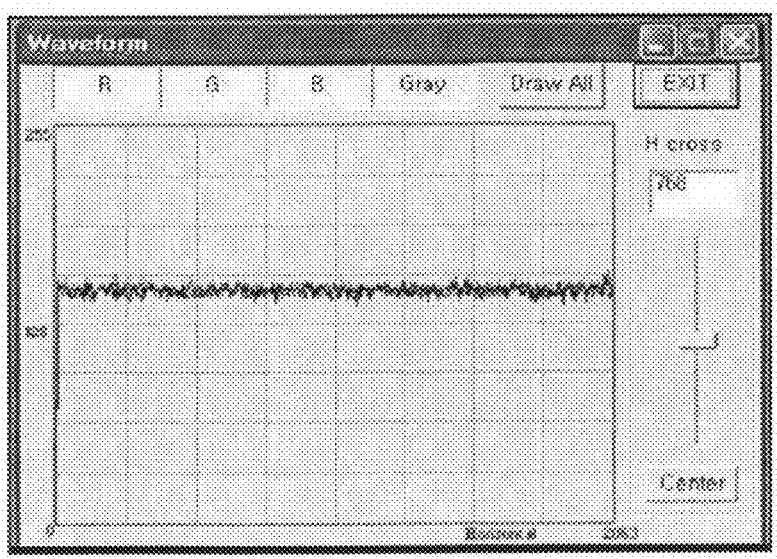
FIG. 2B graphically plots a distribution profile of brightness along a horizontal section of the image of FIG. 2A.
Figure 6A:
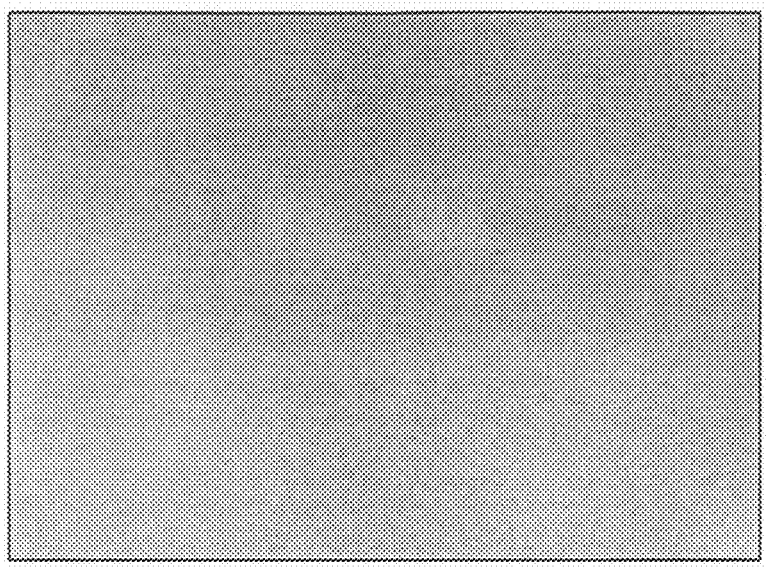
FIG. 6A shows an image modified from the image of FIG. 1A with a lens correction rate of 100% using the radial lens correction technique according to an embodiment of the present invention.
Figure 6B:
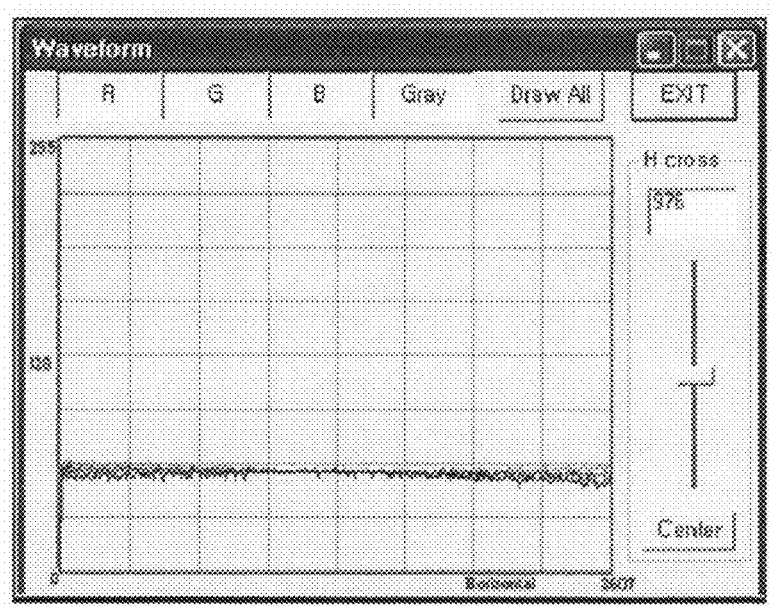
FIG. 6B graphically plots a distribution profile of brightness along the horizontal section of the image in FIG. 6A, according to an embodiment of the present invention.

FIG. 6A shows an image modified from the image of FIG. 1A with a lens correction rate of 100% according to the Equations 4 above. FIG. 6B graphically plots the brightness profiles for the R (red), G (green), and B (blue) color components along a horizontal section running through the focus center for the image of FIG. 6A.

Figure 7A:
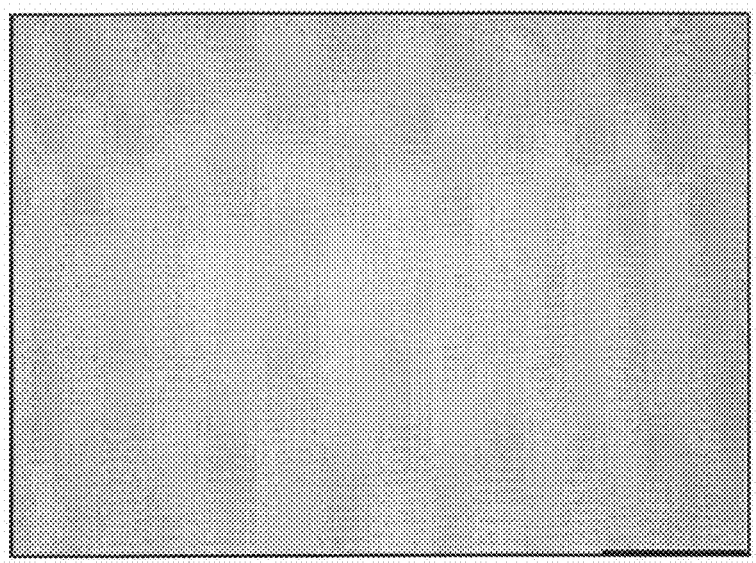
FIG. 7A shows an image modified from the image of FIG. 1A with a lens correction rate of 70% using the radial lens correction technique according to an embodiment of the present invention.

FIG. 7A shows an image modified from the image of FIG. 1A with a lens correction rate of 70% according to the Equations 5 below:

Corrected $R$-channel image data=Original $R$-channel image data*Common Profile*alpha_$R$*(0.7)

Corrected $B$-channel image data=Original $B$-channel image data*Common Profile*alpha_$B$*(0.7)

Corrected $GR$-channel image data=Original $GR$-channel image data*Common Profile*alpha_$GR$*(0.7)

Corrected $GB$-channel image data=Original $GB$-channel image data*Common Profile*alpha_$GB$*(0.7)     [Equations 5]

Figure 7B:
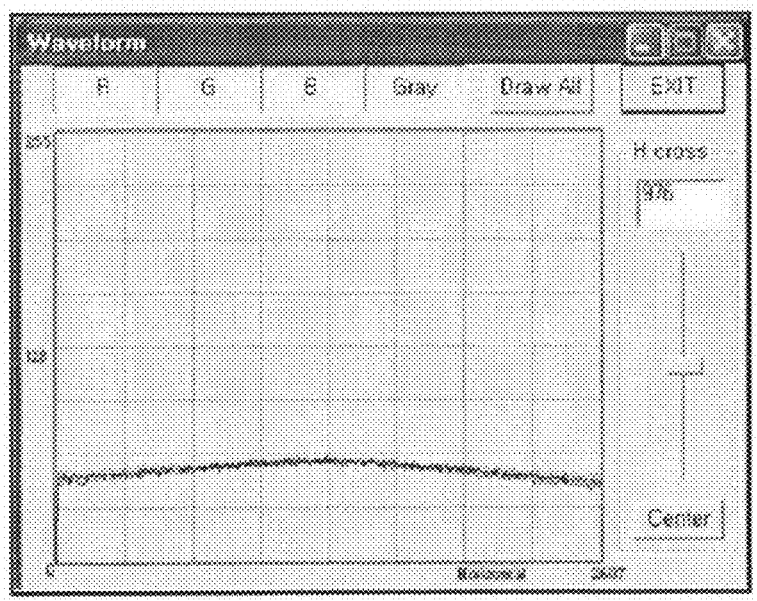
FIG. 7B graphically plots a distribution profile of brightness along a horizontal section of the image shown in FIG. 7A, according to an embodiment of the present invention.

FIG. 7B graphically plots the brightness profiles for the R (red), G (green), and B (blue) color components along a horizontal section running through the focus center for the image of FIG. 7A.

While the present invention has been shown and described with reference to exemplary embodiments thereof, it will be understood by those of ordinary skill in the art that various changes in form and detail may be made herein without departing from the spirit and scope of the present invention, as defined by the following claims.

The present invention is limited only as defined in the following claims and equivalents thereof.

What is claimed is:

1. An apparatus for performing shade correction for a lens in an image sensor, the apparatus comprising:
    a gain profile extractor for generating a respective channel gain profile that is a respective function of gain versus a distance from a focus center of the lens for each of a plurality of color channels from image data generated at a pixel array, wherein said color channels are color components determined for each pixel of said pixel array;
    a common profile calculator for generating a common profile from the channel gain profiles;
    a gain controller calculator for generating a respective gain controller for each of the plurality of color channels from the common profile and the channel gain profiles; and
    a memory device for storing the common profile and the gain controllers,
    wherein the common profile is another function of gain versus the distance from the focus center of the lens, and wherein each of the respective gain controllers is a respective ratio of the respective channel gain profile and the common profile for each color channel.

2. The apparatus of claim 1, further comprising:
    an approximator for generating approximated image data from said image data, wherein the gain profile extractor generates the channel gain profiles from said approximated image data.

3. The apparatus of claim 1, further comprising:
    a lens shade correction module for generating corrected image data by multiplying subsequent image data by the common profile and the gain controllers.

4. The apparatus of claim 3, wherein each of a plurality of color channels for the subsequent image data is multiplied by the common profile and the respective gain controller for each color channel of the subsequent image data.

5. The apparatus of claim 1, wherein each of the gain controllers is a respective constant value that is said respective ratio of the respective channel gain profile and the common profile.

6. The apparatus of claim 1, wherein each of the gain controllers is a respective function of the distance from the focus center of the lens derived as said respective ratio of the respective gain controller and the common profile.

7. The apparatus of claim 1, wherein the common profile is one of an average of the channel gain profiles or a weighted average of the channel gain profiles.

8. The apparatus of claim 1, wherein the image data is generated from said pixel array having a Bayer color pattern, and wherein the color channels include a R (red) channel, a GR (green-red) channel, a GB (green-blue) channel, and a B (blue) channel.

9. The apparatus of claim 1, wherein the common profile and the gain controllers corresponding to the lens are determined once during manufacture of the image sensor.

10. An apparatus for performing shade correction for a lens in an image sensor, the apparatus comprising:
a data processor; and
a memory device having sequences of instructions stored thereon, wherein execution of said sequences of instructions by the data processor causes the data processor to perform steps of:
generating a respective channel gain profile that is a respective function of gain versus a distance from a focus center of the lens for each of a plurality of color channels from image data generated at a pixel array, wherein said color channels are color components determined for each pixel of said pixel array;
generating a common profile from the channel gain profiles;
generating a respective gain controller for each of the plurality of color channels from the common profile and the channel gain profiles; and
storing the common profile and the gain controllers,
wherein the common profile is another function of gain versus the distance from the focus center of the lens, and wherein each of the respective gain controllers is a respective ratio of the respective channel gain profile and the common profile for each color channel.

11. The apparatus of claim 10, wherein execution of said sequences of instructions by the data processor causes the data processor to perform further steps of:
generating approximated image data from said image data; and
generating the channel gain profiles from said approximated image data.

12. The apparatus of claim 10, wherein execution of said sequences of instructions by the data processor causes the data processor to perform a further step of:
generating corrected image data by multiplying subsequent image data by the common profile and the gain controllers.

13. The apparatus of claim 12, wherein each of a plurality of color channels for the subsequent image data is multiplied by the common profile and the respective gain controller for each color channel of the subsequent image data.

14. The apparatus of claim 10, wherein each of the gain controllers is a respective constant value that is said respective ratio of the respective channel gain profile and the common profile.

15. The apparatus of claim 10, wherein each of the gain controllers is a respective function of the distance from the focus center of the lens derived as said respective ratio of the respective gain controller and the common profile.

16. The apparatus of claim 10, wherein the common profile is one of an average of the channel gain profiles or a weighted average of the channel gain profiles.

17. The apparatus of claim 10, wherein the image data is generated from said pixel array having a Bayer color pattern, and wherein the color channels include a R (red) channel, a GR (green-red) channel, a GB (green-blue) channel, and a B (blue) channel.

18. The apparatus of claim 10, wherein the common profile and the gain controllers corresponding to the lens are determined once during manufacture of the image sensor.

* * * * *